United States Patent [19]
Nishioka

[11] Patent Number: 5,644,702
[45] Date of Patent: Jul. 1, 1997

[54] MICROCOMPUTER, MICROCOMPUTER CONTAINING APPARATUS, AND IC CARD

[75] Inventor: Kouichi Nishioka, Itami, Japan

[73] Assignee: Mitsubishi Denki Kabushiki Kaisha, Tokyo, Japan

[21] Appl. No.: 361,600

[22] Filed: Dec. 22, 1994

[30] Foreign Application Priority Data

Dec. 28, 1993 [JP] Japan ................... 5-335620

[51] Int. Cl.$^6$ ........................................ G06F 11/00
[52] U.S. Cl. .................. 395/182.2; 395/182.21; 395/184.01; 395/185.08
[58] Field of Search ............. 395/184.01, 182.2, 395/185.08, 185.01, 182.21, 750; 371/21.4

[56] References Cited

U.S. PATENT DOCUMENTS

| | | | |
|---|---|---|---|
| 4,766,567 | 8/1988 | Kato | 364/900 |
| 5,007,014 | 4/1991 | Nishimura | 364/900 |
| 5,151,854 | 9/1992 | Adams et al. | 364/184 |
| 5,283,792 | 2/1994 | Davies, Jr. et al. | 371/66 |
| 5,311,441 | 5/1994 | Tayama et al. | 364/483 |
| 5,386,575 | 1/1995 | Shinkai et al. | 395/750 |
| 5,398,332 | 3/1995 | Komoda et al. | 395/575 |
| 5,400,341 | 3/1995 | Makino et al. | 371/12 |
| 5,408,648 | 4/1995 | Gokan et al. | 395/575 |

OTHER PUBLICATIONS

C. H. Roth, Jr., *Fundamentals of logic design*, West Publishing Co., St. Paul, Minnesota, 1979, pp. 555–558, SA Fig. A–14.

Computer Dictionary, Microsoft Press.

*Primary Examiner*—Robert W. Beausoliel, Jr.
*Assistant Examiner*—Norman M. Wright
*Attorney, Agent, or Firm*—Leydig, Voit & Mayer

[57] ABSTRACT

A microcomputer includes a CPU, a RAM for storing data, an oscillation circuit and a battery. The CPU has a first threshold for a power supply voltage for ensuring normal operation. The oscillation circuit supplies an oscillation signal to the CPU and also has a second threshold for a power supply voltage for ensuring normal operation. The second threshold is higher than the first threshold.

4 Claims, 6 Drawing Sheets

OUTPUT OF WATCH DOG TIMER

MICROCOMPUTER, MICROCOMPUTER CONTAINING APPARATUS, AND IC CARD

BACKGROUND OF THE INVENTION

1. Field of the Invention

The present invention relates to a microcomputer having a built-in oscillation circuit. The invention also relates to a microcomputer-containing apparatus and an IC card each using such a microcomputer having a built-in oscillation circuit.

2. Description of the Related Art

FIG. 12 illustrates the construction of a conventional microcomputer. A microcomputer 14 comprises therein: a CPU 15; an oscillation circuit 16 and a memory (RAM) 17, both of which are connected to the CPU 15; and a battery 18 for supplying power to the respective circuits. When a start signal is input into the microcomputer 14 from an external unit, an oscillator arranged within the oscillation circuit 16 starts oscillation, and the CPU 15 is actuated to execute data processing. Upon completion of data processing, the CPU 15 executes a stop command and goes into a halt condition.

The CPU 15 and the oscillation circuit 16 are supplied with the power from the battery 18 so as to be actuated. A threshold of the power supply voltage for ensuring normal operation of the CPU 15 is conventionally set higher than that of the oscillation circuit 16. That is, as shown in FIG. 13, a threshold Vth 1 of the CPU 15 is set higher than a threshold Vth 2 of the oscillation circuit 16. Consequently, the battery 18 is dissipated with a lapse of time, and the power supply voltage V is accordingly reduced so as to become lower than the threshold Vth 1 of the CPU 15 at time T1, thereby making it impossible for the CPU 15 to operate normally. However, until the power supply voltage V reaches time T2 at which voltage V starts to become lower than the threshold Vth 2 of the oscillation circuit 16, the oscillation circuit 16 is able to operate normally from the voltage V supplied from the battery 18 so that it can supply an oscillation signal to the CPU 15. In consequence, the CPU 15 runs out of control and executes erroneous data processing, which might write abnormal data into the memory 17 and destroy data stored within the memory 17.

Generally, a control circuit 15a is provided for the CPU 15, and a watch dog timer is arranged within the control circuit 15a so as to monitor runaway of the CPU 15. The watch dog timer monitors the operation of the CPU 15 after every lapse of a predetermined monitoring period and resets the CPU 15 upon detecting abnormal operation of the CPU 15. However, if the CPU 15 runs away out of control due to a reduction in the power supply voltage V, the watch dog timer provided for the CPU 15 is also unable to operate normally, thereby making it impossible to reset the CPU 15.

Further, after time T1 at which the power supply voltage V becomes lower than the threshold Vth 1 of the CPU 15, there is sharp dissipation in the battery 18 due to unnecessary operation of the oscillation circuit 16. This might cause a failure in backup of the memory 17 and further give rise to a danger of erasing the data stored in the memory 17.

As described above, a conventional battery-operated microcomputer having a built-in oscillation circuit presents a problem in that dissipation in a battery might bring about runaway of the CPU and further leads to destruction of the content of a memory.

SUMMARY OF THE INVENTION

Accordingly, in order to overcome the above drawbacks, an object of the present invention is to provide a microcomputer which can be protected from the destruction of data stored in a memory even though a battery is dissipated.

Another object of the present invention is to provide a microcomputer-containing apparatus and an IC card each having such a microcomputer mounted thereon.

In order to achieve the above objects, according to a first aspect of the present invention, there is provided a microcomputer comprising: a CPU having a first threshold for a power supply voltage for ensuring normal operation; a memory for storing data therein; an oscillation circuit supplying an oscillation signal to the CPU and having a second threshold for a power supply voltage for ensuring normal operation, the second threshold being higher than the first threshold of the CPU; and a battery for supplying a power supply voltage to each of the CPU, the memory and the oscillation circuit.

According to a second aspect of the present invention, there is provided a microcomputer comprising: a CPU for processing data; a memory for storing data therein; an oscillation circuit supplying an oscillation signal to the CPU; a monitor circuit for monitoring the operation of the CPU; an oscillation discontinuing circuit terminating oscillation by the oscillation circuit when the monitor circuit detects abnormal operation of the CPU; and a battery for supplying a power supply voltage to each of the CPU, the memory, the oscillation circuit, the monitor circuit and the oscillation discontinuing circuit.

According to a third aspect of the present invention, there is provided a microcomputer-applied apparatus comprising: a CPU having a first threshold for a supply voltage for ensuring a normal operation; a memory for storing data therein; an oscillation circuit supplying an oscillation signal to the CPU and having a second threshold for a supply voltage for ensuring a normal operation, the second threshold being higher than the first threshold of the CPU; an application circuit for executing predetermined processing based on a signal being output from the CPU; and a battery for supplying a power supply voltage to each of the CPU, the memory, the oscillation circuit and the application circuit.

According to a fourth aspect of the present invention, there is provided an IC card for transmitting and receiving data with terminal equipment, comprising: a CPU having a first threshold for a power supply voltage for ensuring normal operation; a memory for storing data therein; an oscillation circuit supplying an oscillation signal to the CPU and having a second threshold for a supply voltage for ensuring a normal operation, the second threshold being higher than the first threshold of the CPU; a battery; and a power supply control circuit supplying a voltage greater than a predetermined value to each of the CPU, the memory and the oscillation circuit, the voltage being supplied from the terminal equipment, while the control circuit supplies a power supply voltage to each of the CPU, the memory and the oscillation circuit from the battery when the voltage supplied from the terminal equipment is not more than the predetermined value and when the voltage is not supplied from the terminal equipment.

DESCRIPTION OF THE PREFERRED EMBODIMENTS

Embodiments of the present invention will now be described with reference to the drawings.

First Embodiment

Figure 1:
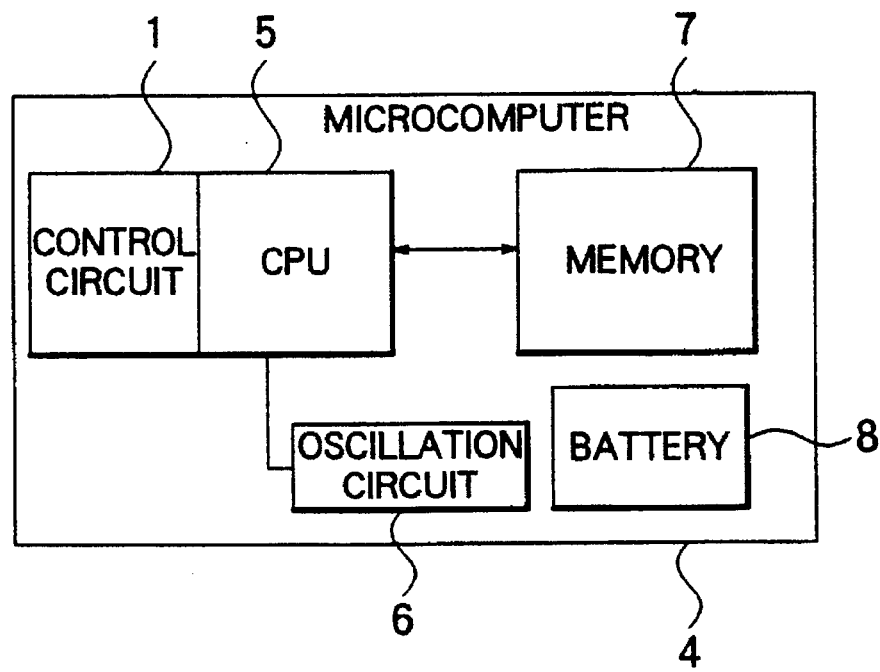
FIG. 1 is a block diagram illustrative of a microcomputer according to a first embodiment of the present invention.
Figure 2:
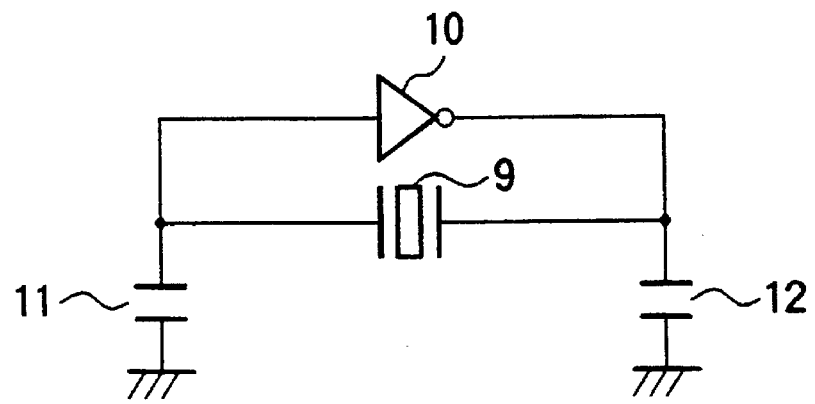
FIG. 2 is a circuit diagram illustrative of the construction of an oscillation circuit used in the first embodiment.

FIG. 1 is a block diagram illustrative of a microcomputer according to a first embodiment of the present invention. A microcomputer 4 comprises therein: a CPU 5; an oscillation circuit and a memory (RAM) 7, both of which are connected to the CPU 5; and a battery 8 for supplying power to these circuits. Connected to the CPU 5 is a control circuit 1 for controlling the operation of the CPU 5. A watch dog timer (not shown) is further arranged within the control circuit 1. As illustrated in FIG. 2, the oscillation circuit 6 has an oscillator 9 which is connected in parallel with an oscillation inverter 10. Load capacitors 11 and 12 are connected to respective ends of the oscillator 9.

Figure 3:
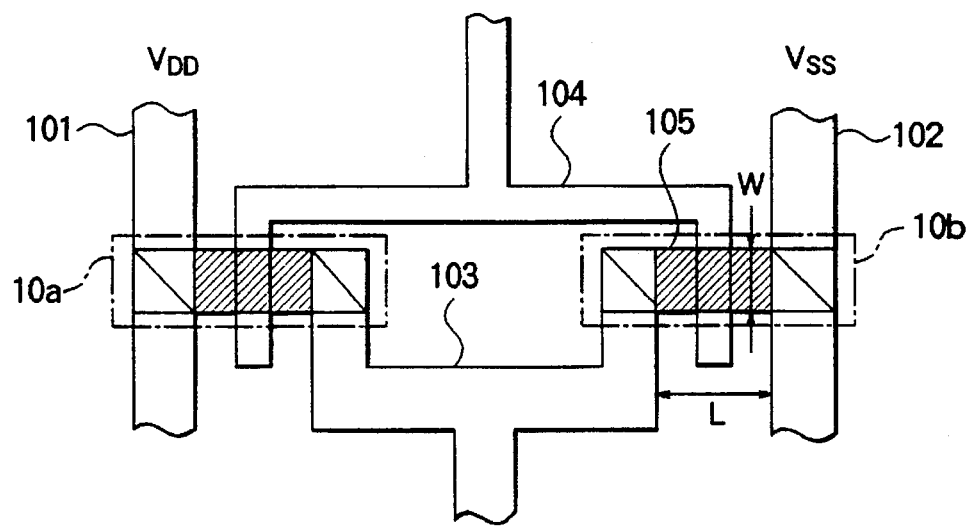
FIG. 3 illustrates the pattern of an oscillation inverter used for the oscillation circuit shown in FIG. 2.

Further, FIG. 3 illustrates the layout of the oscillation inverter 10. The oscillation inverter 10 has a pair of MOS transistors 10a and 10b connected in series to each other via aluminum wiring 103 between a $V_{DD}$ power supply line 101 and a $V_{SS}$ power supply line 102. The respective gates of the transistors 10a and 10b are connected to each other by a polysilicon film 104, and the aluminum wiring 103 and the polysilicon film 104 are connected to both ends of the oscillator 9. The hatched portion indicates a field oxide 105 of each of the transistors 10a and 10b.

Conductance $\beta$ of the MOS transistors is typically represented by equation: $\beta = C(W-\Delta W)/(L-\Delta L)$ wherein W: gate width, L: gate length, $\Delta W$: compensation term for a variation in the gate width due to the penetration of the oxide film, and $\Delta L$: correction term for a variation in the gate length due to the diffusion from the source and the drain into the gate. C indicates a constant expressed by equation: $C = \epsilon_{ox}/T_{ox}$ wherein $\epsilon_{ox}$ indicates the permittivity of the oxide film; $\mu$ represents the mobility (=velocity/electric field); and $T_{ox}$ indicates the thickness of the oxide film. As is seen from the equation of $\beta$, a decrease in gate width W or an increase in gate length L causes a decrease in conductance $\beta$, thereby limiting the voltage margin for operating the MOS transistors and accordingly reducing the driving capacity. That is, the threshold for ensuring normal operation of the transistors is increased. In the first embodiment, the oscillation inverter 10 within the oscillation circuit 6 is thus constructed to have a second threshold Vth 3 higher than a first threshold Vth 4 provided for the CPU 5. Hence, a reduction in the voltage of the battery 8 first causes interruption of oscillation performed by the oscillation circuit 6, which accordingly results in discontinuation of the operation performed by the CPU 5.

Figure 4:
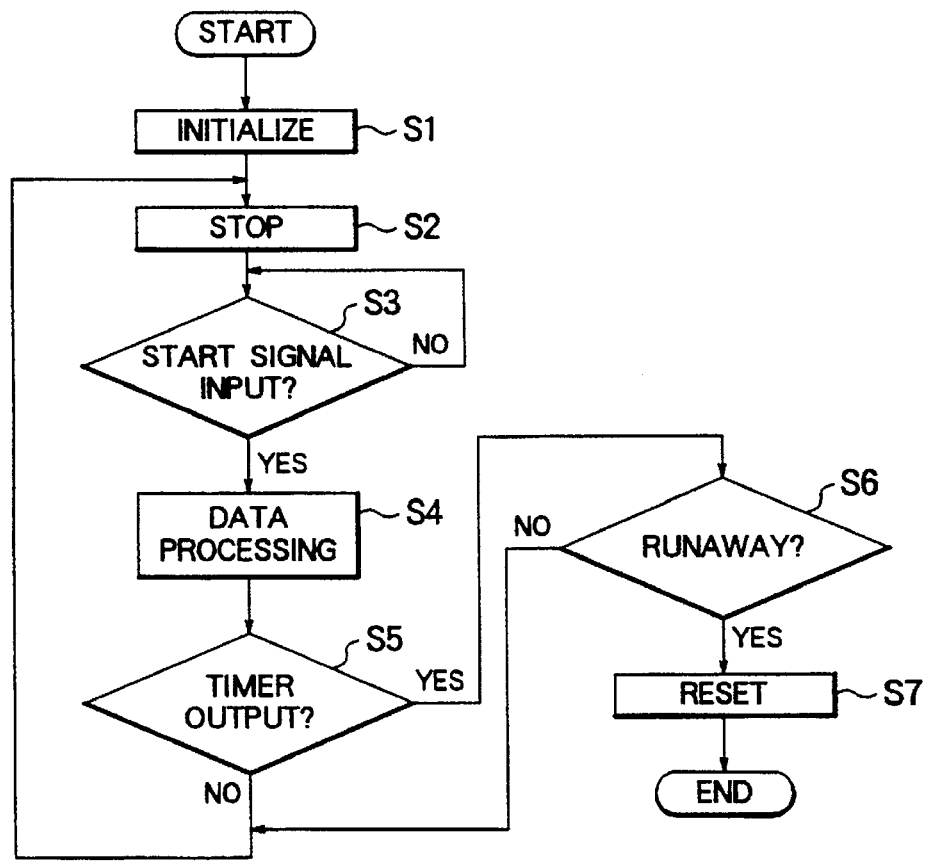
FIG. 4 is a flow chart illustrative of the operation of the first embodiment.

The operation of the first embodiment will now be described with reference to the flow chart of FIG. 4. The power supply is first switched on. The CPU 5 executes initialization in step S1, and then is halted in step S2. In such a state, if a start signal is input into the microcomputer 4 from an external unit in step S3, the oscillator 9 arranged within the oscillation circuit 6 starts oscillation, and the CPU 5 is actuated so as to execute data processing in step S4. Simultaneously with the operation of the CPU 5, the watch dog timer within the control circuit 1 starts counting. A predetermined count value corresponding to a duration longer than the actual duration required for normal data processing has been set in the watch dog timer. Upon each completion of data processing, the count value of the watch dog timer is reset by the CPU 5.

Thus, if the CPU 5 executes data processing normally, the count value of the watch dog timer is reset upon completion of data processing, and accordingly, a signal indicative of completion of counting is not output from the watch dog timer in step S5. In consequence, the flow returns to step S2 in which the CPU 5 is halted and is set in the standby state until a subsequent start signal is input. On the other hand, if the answer in step S5 is YES, the flow proceeds to step S6 in which it is determined whether the CPU 5 has executed normal data processing, in other words, whether the CPU 5 has run away, out of control. If it is determined in step S6 that runaway of the CPU 5 is not detected, upon completion of data processing, the flow returns to step S2 in which the CPU 5 is halted. If it is determined in step S6 that the CPU 5 has run away out of control, the flow proceeds to step S7 in which the CPU 5 is reset.

Figure 5:
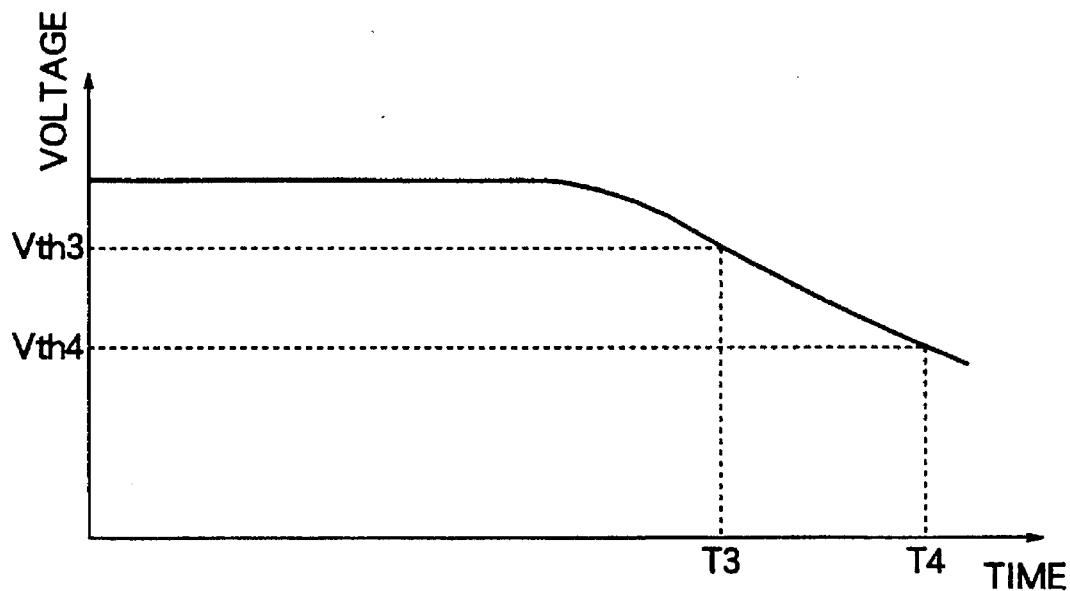
FIG. 5 illustrates the state in which a battery is dissipated in the first embodiment.

As shown in FIG. 5, in the first embodiment, the second threshold Vth 3 provided for the oscillation inverter 10 is higher than the first threshold Vth 4 provided for the CPU 5. Accordingly, if voltage V of the battery 8 is reduced for some reason and becomes lower than the second threshold Vth 3 of the oscillation circuit 6 at time T3, oscillation of the oscillation circuit 6 is first interrupted, accordingly causing discontinuation of the operation by the CPU 5. Afterwards, since the battery 8 is dissipated only by the operation of the circuits other than the CPU 5 and the oscillation circuit 6, there is a gentle reduction in voltage V of the battery 8. Although voltage V reaches the first threshold Vth 4 of the CPU 5 at time T4, the CPU 5 has already been halted at that time, thus allowing a gentle reduction in voltage V of the CPU 5 thereafter.

Second Embodiment

Figure 6:
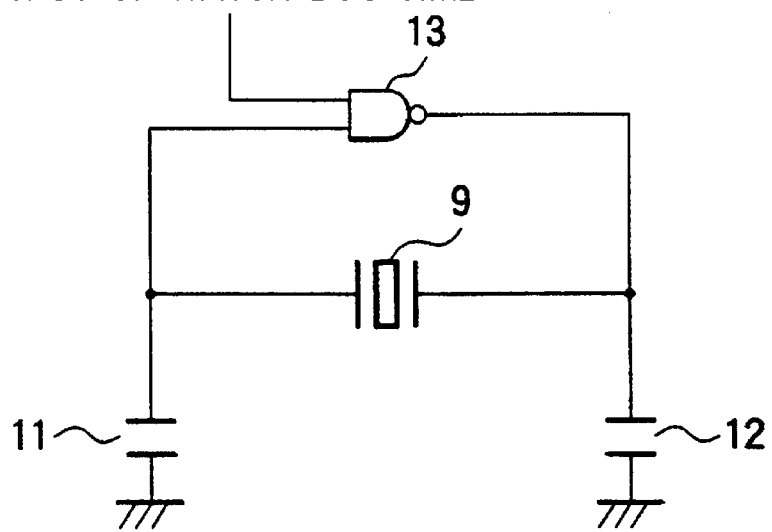
FIG. 6 is a circuit diagram illustrative of the construction of an oscillation circuit used for a microcomputer according to a second embodiment.

In place of the oscillation circuit 6 shown in FIG. 2, a different type of oscillation circuit shown in FIG. 6 may be arranged. This oscillation circuit includes an oscillator 9. Load capacitors 11 and 12 are connected to respective ends of the oscillator 9, and a NAND gate 13, which is an oscillation discontinuing circuit, is also connected in parallel with the oscillator 9. The NAND gate 13 is connected at one input to the oscillator 9 and at the other input to a watch dog timer arranged within the control circuit 1. The watch dog timer constitutes a monitor circuit and normally outputs a H level signal to the NAND gate 13 of the oscillation circuit. When the watch dog timer counts a predetermined count value corresponding to a duration longer than the duration required for normal data processing, it resets the CPU 5 and also outputs a L level signal to the NAND gate 13, thereby stopping oscillation by the oscillation circuit.

Since the oscillation circuit is constructed as described above, upon completion of the predetermined counting by the watch dog timer, the CPU 5 is reset and oscillation of the oscillation circuit is simultaneously discontinued. That is, a reduction in voltage V of the battery 8 so as to become lower than a threshold of the CPU 5 does not allow the CPU 5 to operate normally. Concurrently, a signal from the watch dog timer stops oscillation performed by the oscillation circuit, thereby avoiding unnecessary reading from and writing into the memory 7 caused by runaway of the CPU 5.

Third Embodiment

Figure 7:
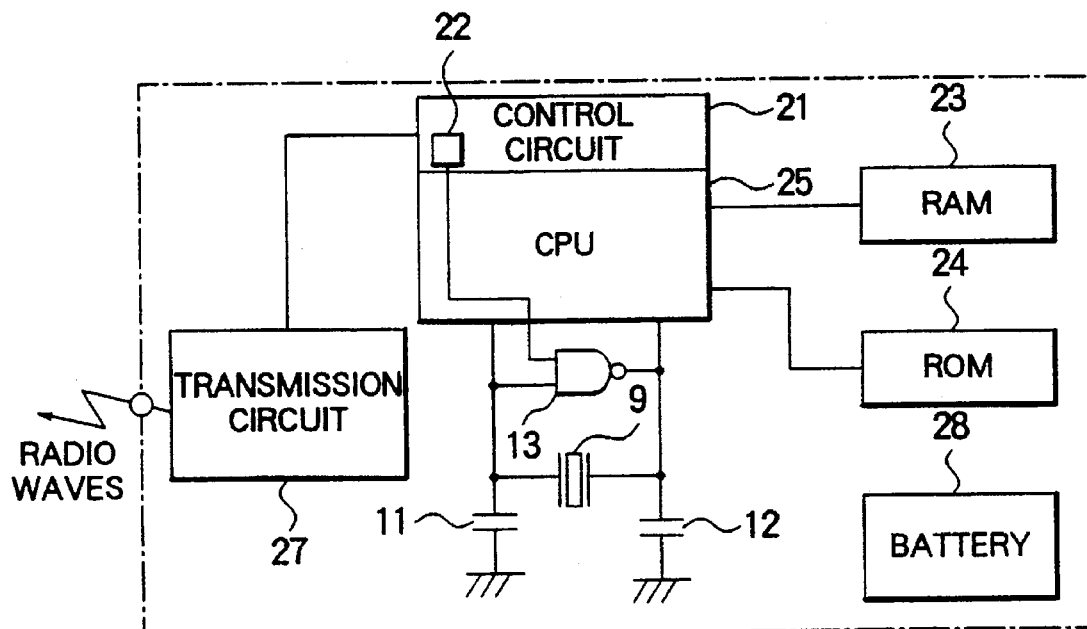
FIG. 7 is a block diagram illustrative of a microcomputer-applied apparatus according to a third embodiment.

FIG. 7 illustrates a microcomputer-containing apparatus having, built-in, the oscillation circuit shown in FIG. 6. This applied apparatus is used as, for example, a remote control for a television set. Connected to a CPU 25 are a control circuit 21, a RAM 23 and a ROM 24. Also connected to the CPU 25 is an oscillation circuit including a oscillator 9, load capacitors 11 and 12, and a NAND gate 13. Connected to the NAND gate 13 is a watch dog timer 22 arranged within the control circuit 21. A transmission circuit 27 for transmitting radio waves to a television set is connected to the control circuit 21. Moreover, a battery 28 is arranged to supply power to the respective circuits.

According to the foregoing construction of the microcomputer-containing apparatus, when a reduction in the voltage of the battery 28 prevents normal operation of the CPU 25, the watch dog timer 22 resets the CPU 25 and also outputs a L level signal to the NAND gate 13. This causes discontinuation of oscillation performed by the oscillator 9, thereby preventing runaway of the CPU 25 and avoiding a sharp dissipation of the battery 28.

Similarly, it is possible to form a microcomputer applied apparatus having a built-in oscillation circuit shown in FIG. 2, in which case, a memory can also be protected from unnecessary reading/writing caused by runaway of the CPU.

Fourth Embodiment

Figure 8:
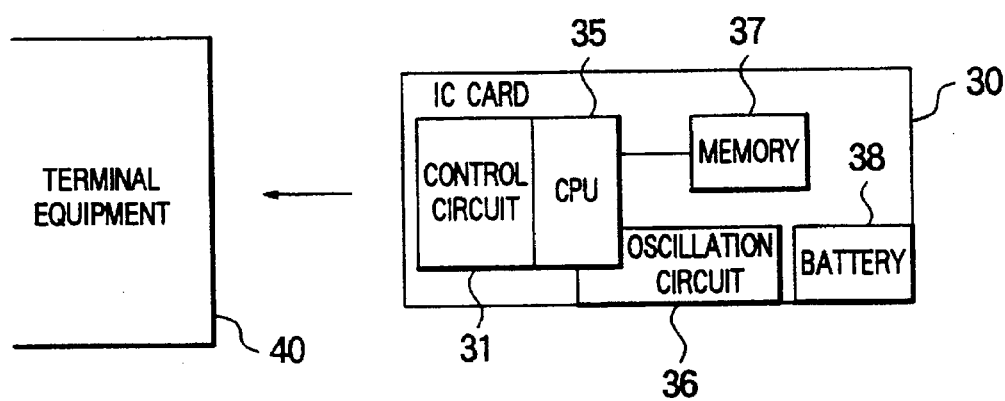
FIG. 8 is a block diagram illustrative of an IC card according to a fourth embodiment.

FIG. 8 illustrates an IC card having a microcomputer, similar to that of the first embodiment, mounted thereon. The IC card 30 comprises a CPU 35, a control circuit 31, an oscillation circuit 36, a memory 37 and a battery 38. The oscillation circuit 36, as well as the circuit shown in FIG. 2, includes an oscillation inverter having a second threshold higher than a first threshold provided for the CPU 35. The IC card 30 constructed as described above is inserted into terminal equipment 40, and in such a state, it transmits data to and receives data from the terminal equipment 40.

Figure 9:
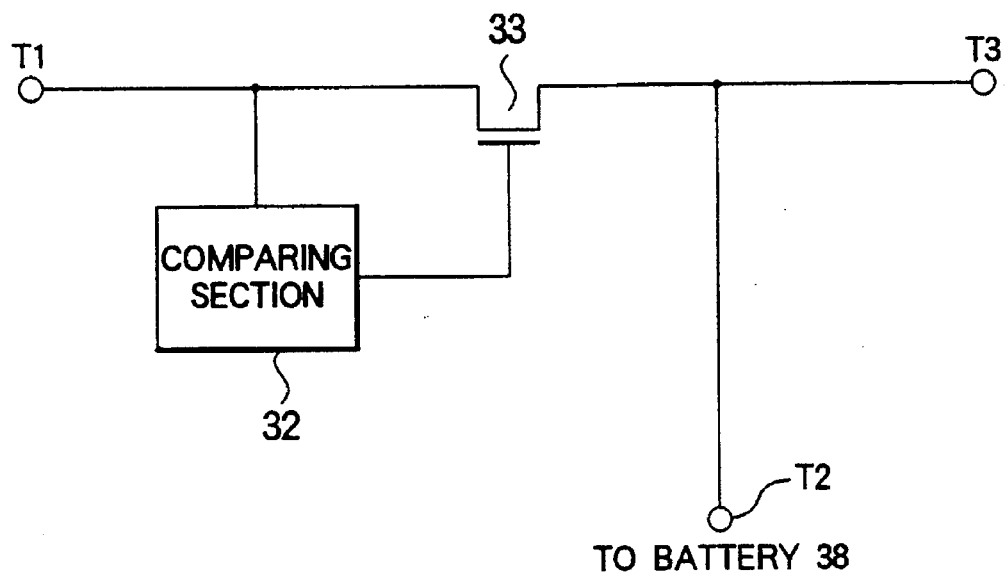
FIG. 9 illustrates the construction of a power supply control circuit used for the IC card of the fourth embodiment.

Within the control circuit 31, a watch dog timer (not shown) and a power supply control circuit shown in FIG. 9 are arranged. The power supply control circuit is used for selecting one of the terminal equipment 40 and the battery 38 so as to supply power to the respective circuits within the IC card 30. The control circuit includes a comparing section 32 and a transistor 33. When the IC card 30 is inserted into the terminal equipment 40, a power supply voltage is supplied to the IC card 30 from the terminal equipment 40 via terminal T1. The comparing section 32 compares the power supply voltage supplied to the IC card 30 via terminal T1 with a predetermined value. When the compared power voltage exceeds the predetermined value, the comparing section 32 permits the transistor 33 to conduct and supplies the power voltage to the respective circuits within the IC card 30 from terminal T3. On the other hand, when the power voltage is not more than the predetermined value, or when a power voltage is not supplied to the IC card 30, which might be due to, for example, a disconnection between the IC card 30 and the terminal equipment 40, the comparing section 32 interrupts the transistor 33. This enables a supply of a power voltage via terminal T3 to the respective circuits within the IC card 30 from a built-in battery 38 connected to terminal T2.

Figure 10:
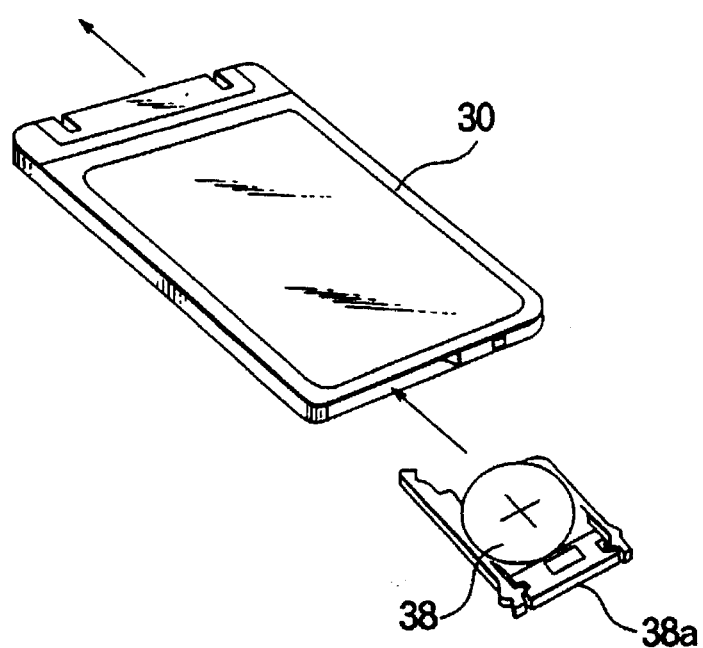
FIG. 10 is a perspective view of the IC card in the fourth embodiment.
Figure 11:
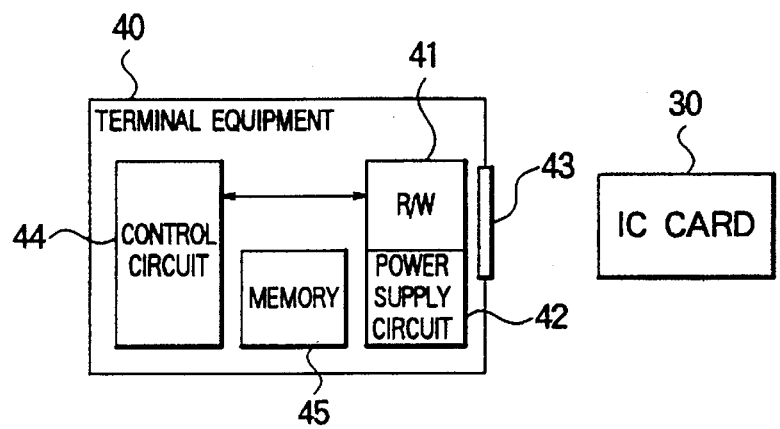
FIG. 11 is a block diagram illustrative of terminal equipment to be connected to the IC card of the fourth embodiment.
Figure 12:
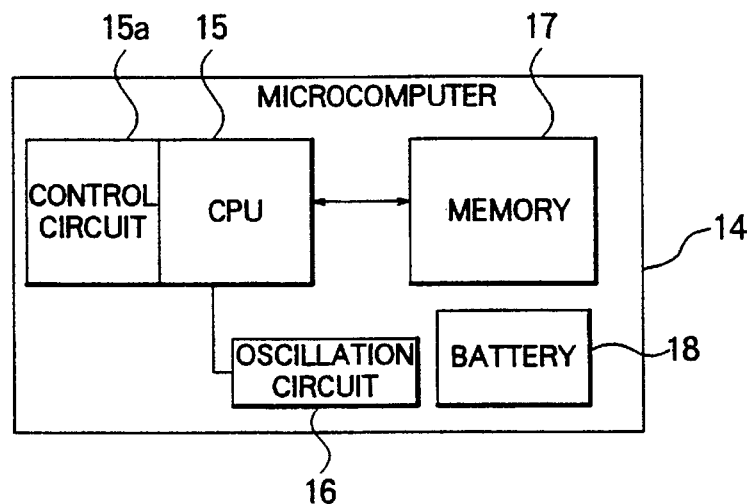
FIG. 12 is a block diagram illustrative of a conventional microcomputer.
Figure 13:
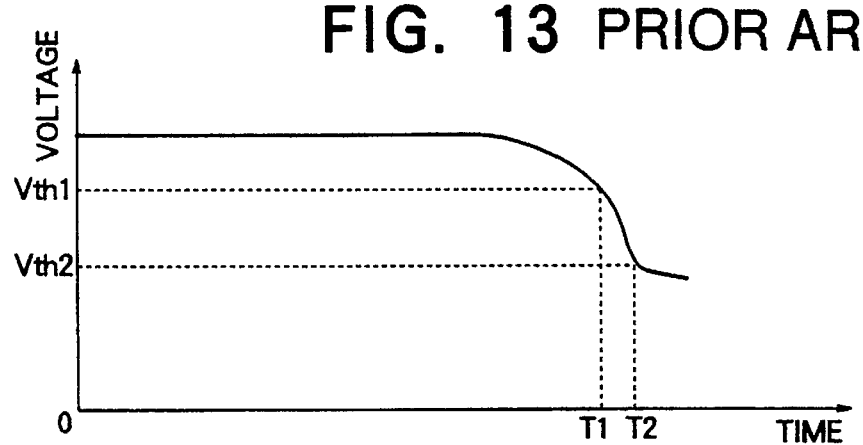
FIG. 13 illustrates the state in which a battery used for the microcomputer shown in FIG. 12 is dissipated.

As shown in FIG. 10, the IC card 30 has a battery holder 38a detachably attached to the IC card 30, thereby supporting the battery 38. FIG. 11 shows the internal construction of the terminal equipment 40. The terminal equipment 40 comprises a connector 43 to be electrically connected to the IC card 30, a reader/writer 41, a power supply circuit 42, a control circuit 44 and a memory 45. When the IC card 30 is connected to the terminal equipment 40 via the connector 43, a power supply voltage is supplied to terminal T1 of the power control circuit 31 of the IC card 30 from the power supply circuit 42.

Since the IC card 30 is constructed as described above, if there is a reduction in the voltage of the battery 38, the oscillation performed by the oscillation circuit 36 is first interrupted, thereby preventing runaway of the CPU 35 and avoiding sharp dissipation of the battery 38. This enables the construction of a highly-reliable IC card system. Additionally, a dead battery can easily be replaced by a new one using the battery holder 38a.

Likewise, it is possible to form an IC card having a built-in oscillation circuit shown in FIG. 6, in which case, a memory can also be protected from unnecessary reading/writing caused by runaway of the CPU, and sharp dissipation of the battery can also be avoided.

What is claimed is:

1. A microcomputer comprising:

a CPU having a first threshold power supply voltage that must be exceeded to ensure normal operation of said CPU;

a memory for storing data;

an oscillation circuit for supplying an oscillation signal to said CPU and having a second threshold power supply voltage that must be exceeded to ensure normal operation of said oscillation circuit, the second threshold being higher than the first threshold, said oscillation circuit comprising an oscillator and an inverter connected in parallel, said inverter comprising first and second MOS transistors including, respectively, first and second gate electrodes, said first and second MOS transistors being connected in series to each other between a $V_{DD}$ supply line and a $V_{SS}$ supply line and the first and second gate electrodes being connected together whereby the second threshold is established by controlling dimensions of the first and second gate electrodes; and a battery for supplying a power supply voltage to each of said CPU, said memory, and said oscillation circuit.

2. The microcomputer-containing apparatus according to claim 1 comprising a control circuit connected to said CPU and including a watch dog timer connected to said CPU for resetting said CPU and stopping oscillation of said oscillator when the power supply voltage falls below the second threshold power supply voltage and said battery supplies the power supply voltage to said control circuit.

3. The microcomputer according to claim 2 comprising an application circuit for executing predetermined processing in response to a signal output from said CPU.

4. A IC card for transmitting data to and receiving data from terminal equipment comprising:

a CPU having a first threshold power supply voltage that must be exceeded to ensure normal operation of said CPU;

a memory for storing data;

an oscillation circuit for supplying an oscillation signal to said CPU and having a second threshold power supply voltage that must be exceeded to ensure normal operation of said oscillation circuit, the second threshold being higher than the first threshold;

a battery; and a power supply control circuit for supplying a voltage greater than a predetermined value from said terminal equipment to each of said CPU, said memory, and said oscillation circuit, and from said battery when the voltage supplied from the terminal equipment is not more than the predetermined value including when no voltage is supplied from the terminal equipment.

* * * * *